United States Patent [19]

Netravali et al.

[11] 4,232,338
[45] Nov. 4, 1980

[54] METHOD AND APPARATUS FOR VIDEO SIGNAL ENCODING WITH MOTION COMPENSATION

[75] Inventors: Arun N. Netravali, Matawan; John D. Robbins, Aberdeen, both of N.J.

[73] Assignee: Bell Telephone Laboratories, Incorporated, Murray Hill, N.J.

[21] Appl. No.: 46,953

[22] Filed: Jun. 8, 1979

[51] Int. Cl.³ .............................................. H04N 7/12
[52] U.S. Cl. .................................. 358/136; 358/138; 358/105
[58] Field of Search ..................... 358/136, 138, 105

[56] References Cited

U.S. PATENT DOCUMENTS 3,887,763  6/1975  Hinoshita et al. .................... 358/138
4,144,543  3/1979  Koga ..................................... 358/136

*Primary Examiner*—Richard Murray
*Attorney, Agent, or Firm*—Barry H. Freedman

[57] ABSTRACT

Method and apparatus for encoding a video signal wherein the prediction errors for previously encoded pels are evaluated using motion compensation and frame difference predictions. Each present pel intensity value is then predicted using the technique which produced the smaller prediction error sum. Prediction errors for the present pel are encoded, together with address information, if the error exceeds a threshold value. The motion compensated prediction utilizes a displacement estimate which is recursively updated. A decoder is also described.

18 Claims, 8 Drawing Figures

PERFORMANCE OF 3 CODERS FOR "JUDY"

PERFORMANCE OF 3 CODERS FOR "MIKE AND NADINE"

METHOD AND APPARATUS FOR VIDEO SIGNAL ENCODING WITH MOTION COMPENSATION

TECHNICAL FIELD

This invention relates generally to encoding of video information and, more particularly, to predictive encoding using motion compensation.

BACKGROUND OF THE INVENTION

In applicants' copending application Ser. No. 21071 filed Mar. 16, 1979, and assigned to the same assignee as the present application, a method and apparatus for encoding a video signal is described wherein the intensity value of each picture element (pel) is predicted by using an estimate of the displacement of objects in the picture to locate the picture element or location in the previous frame which has the same intensity value. Three types of picture segments are identified by first dividing the picture into background and moving areas and then classifying pels in the moving area as compensable or uncompensable, depending upon the magnitude of the prediction error. The video signal is then encoded using (a) address information for both moving area compensable and uncompensable segments, (b) address information for the non-moving or background segment, and (c) the error values for the uncompensable pels.

While the coding strategy of the aforesaid technique is successful in significantly reducing the bit rates needed to represent the video signal as compared to conditional replenishment which does not employ motion compensation, it has been found that use of a single predictor in all areas of a picture is not always advantageous. Furthermore, encoding of addresses for the three types of picture segments is often inefficient. Accordingly, it is the broad object of the present invention to further reduce the amount of data which must be encoded to adequately represent and efficiently encode a video signal.

SUMMARY OF THE INVENTION

In accordance with the present invention, each picture element is predicted by either motion compensated or frame difference predictors, based upon the relative magnitude of prediction errors for each of the predictors associated with a preselected set of nearby pels which have already been encoded. Each prediction thus made is then classified as predictable or unpredictable, depending upon the magnitude of the prediction error. This results in dividing the picture into only two types of segments or areas for which address information is encoded, together with the error values associated with unpredictable pels. As in the above-mentioned copending application, the displacement estimates are advantageously computed in a recursive manner, such that each displacement estimate is used in the formation of the succeeding estimate.

BRIEF DESCRIPTION OF THE DRAWING

The invention will be more readily appreciated by consideration of the following detailed description when read in light of the accompanying drawing in which.

DETAILED DESCRIPTION

Figure 1:
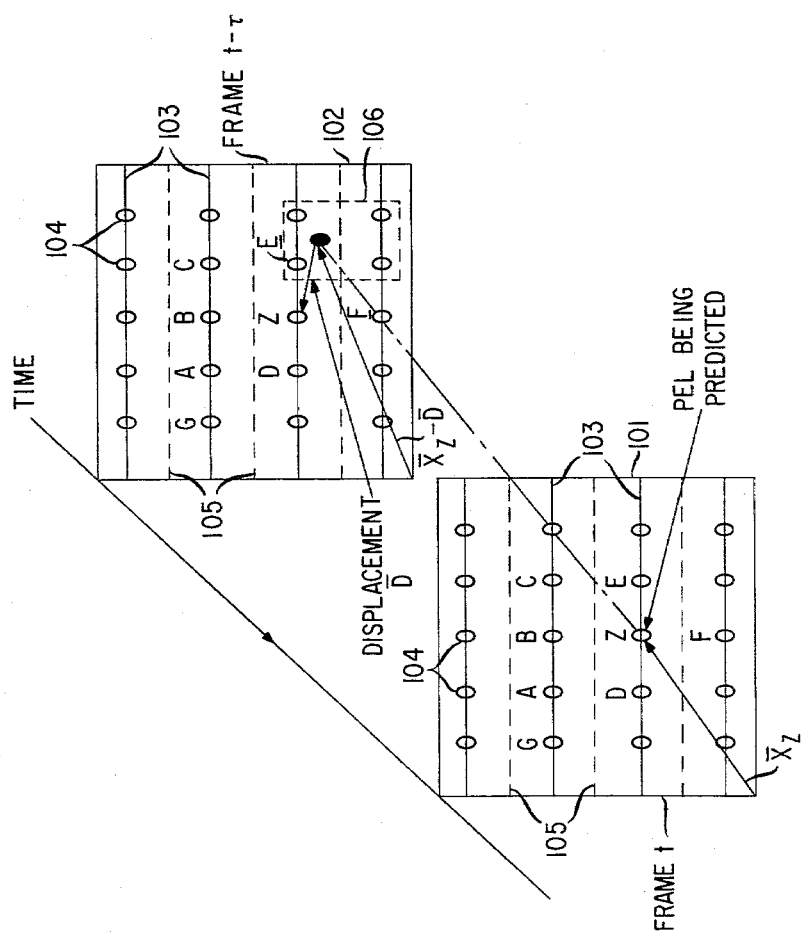
FIG. 1 is a diagram illustrating the locations of picture elements in present and prior frames of a video signal being encoded.

Referring first to FIG. 1, boxes 101 and 102 represent the outlines of successive frames of a video signal, the former being the presently processed frame at time t and the latter being the previous frame at time $t-\tau$, where $\tau$ is the time interval between frames. In both frames, lines 103 represent a plurality of generally parallel scan lines, each of which contain a plurality of picture element (pel) sites or locations indicated by small circles 104. Dotted lines 105 indicate interlaced scan lines in the field between frames 102 and 101, not shown.

In FIG. 1 and in the following description, it will be assumed that pel Z is the location in the present frame for which the intensity is being predicted and encoded at time t. The location of pel Z is represented by the vector $\bar{x}_Z$, and the picture intensity at pel Z in the present frame is $I(\bar{x}_z,t)$. The pels surrounding pel Z and involved in the encoding are designated A-G, and each has a particular spatial relation to pel Z: pel B is immediately above pel Z in the preceeding scan line, and pels A and G are one and two sample times before pel B, respectively. Pel C is also on the previous line, and is $l-1$ sample times prior to pel Z, where l represents the number of samples in each scan line. Pels D and E are before and after pel Z, respectively, on the same scan line, and pel F is below pel Z on the next scan line. As encoding proceeds, each pel within a frame is processed in a manner similar to that described for pel Z. Special arrangements are made for pels along the edge of the picture, usually by assuming the existence of an extra pel having the same value as the edge pel.

As discussed in the aforesaid copending application, motion compensated prediction is intended to determine the location in the previous frame of the object which has moved to the location of the presently processed pel (pel Z) in the present frame. This is done since, in the ideal case, the intensities at these locations will be the same, and the previous value can thus be used as a prediction of the latter. This desired equality is written $I(\bar{x}_Z,t)=I(\bar{x}_z-\overline{D},t-\tau)$, where D is the true displacement (a vector) of the object at pel Z. If $\overline{D}$ is only approximate, as is most usually the case, the equality does not hold, and a prediction error exists. This error is called the displaced frame difference DFD. For background picture areas, $\overline{D}$ should be zero, so that $I(\bar{x}_Z,t)$ is ideally equal to $I(\bar{x}_Z,t-\tau)$. For D=0, the prediction error is the frame difference FDIF well known in conditional replenishment encoding.

In frame 102 of FIG. 1, vector $\overline{D}$ represents the present displacement estimate and vector $\bar{x}_Z-\overline{D}$ represents the location in the previous frame having an intensity which corresponds (ideally) to the intensity of pel Z at location $\bar{x}_Z$ in the present frame. Since $\bar{x}_Z-\overline{D}$ is generally not located precisely at a pel location (corresponding to a sample point of the video signal), the intensity at the location is determined by interpolation. For this purpose, a three point linear interpolation of the intensity values of the four nearest pels in box 106 can be performed by discarding the furthest pel and combining horizontal and vertical gradients of the remaining three pels in any suitable manner well known to those skilled in the art.

Figure 2:
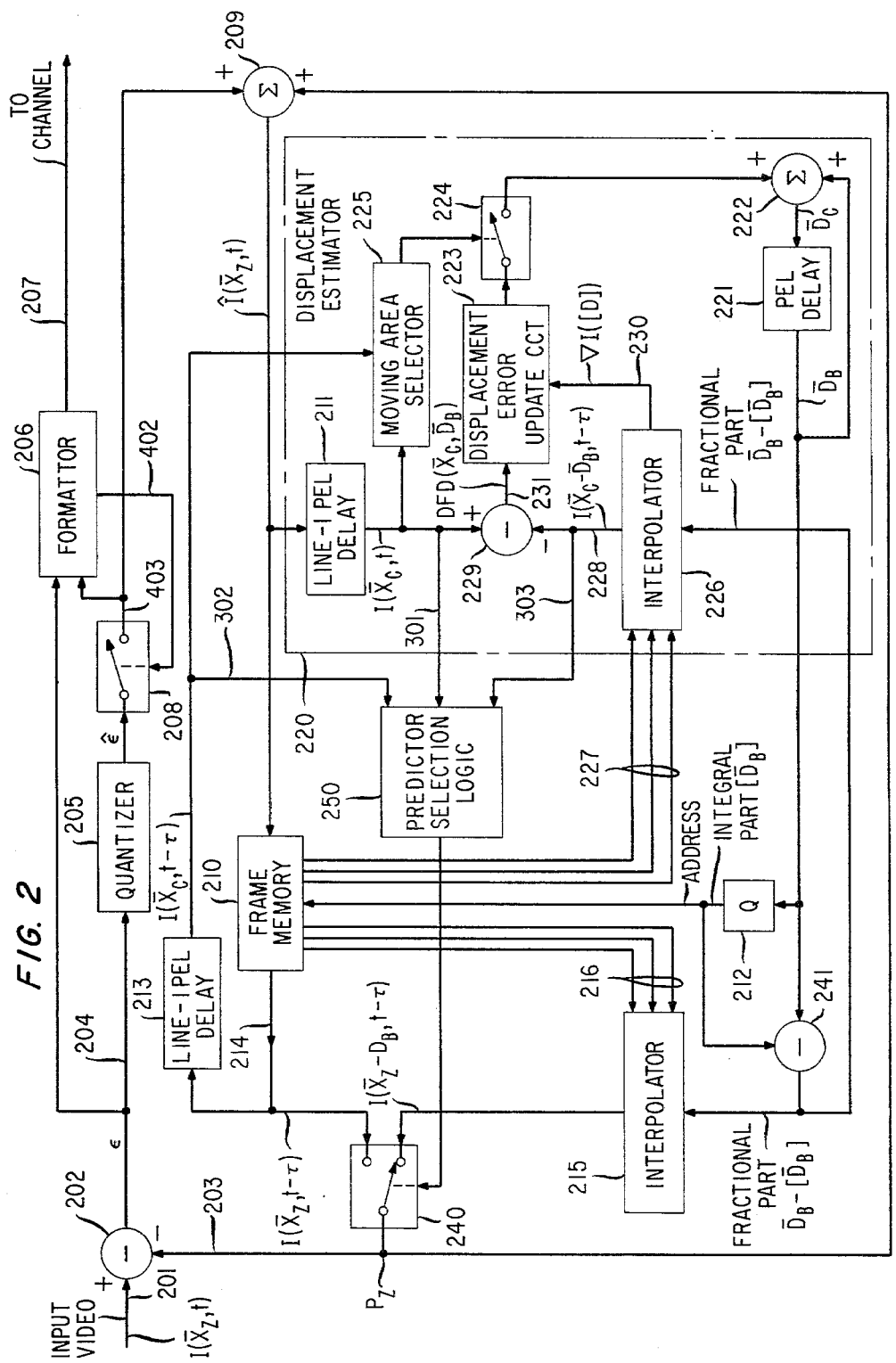
FIG. 2 is a block diagram of a motion compensated encoder arranged in accordance with the principles of the present invention.

A block diagram of an encoder constructed in accordance with the present invention is shown in FIG. 2. The encoder is structured basically as a predictive encoder, such that the intensity of the present sample $I(\bar{x}_Z, t)$ of the input signal on line 201 is applied to one input of a subtractor 202 and the predicted value $P_Z$ of the same sample (on line 203) are differenced to yield an error value $\epsilon$ on line 204. This error value is applied to a formatter 206, described hereinafter, which provides the encoder output on line 207. The error value is also applied to a quantizer 205 and thence to one input of an adder 209 via switch 208. The second input to adder 209 is the predicted value $P_Z$ on line 203, so that its output $\hat{I}(\bar{x}_Z, t)$ is the reconstructed value of the input signal sample being processed. This value is stored in a frame memory 210 and input to a displacement estimator circuit designated generally at 220, all for the purpose of forming the next predicted value to be coupled to line 203.

The arrangement and operation of displacement estimator circuit 220 is explained generally in the aforesaid copending application and in detail in applicants' yet another application Ser. No. 21063 filed Mar. 16, 1979, and assigned to the same assignee. For convenience, the operation of this circuit will be summarized. The displacement estimates provided by estimator 220 are recursively updated, on a pel-by-pel basis, with each estimate being used in the computation of the succeeding estimate. For this purpose, the present estimate is stored in a one pel delay circuit 221, the output of which is coupled to one input of an adder 222. The second adder input is a displacement update term, generated in a displacement error update circuit 223, described below. The update from circuit 223 is used only in moving areas of the picture, as determined by moving area selector 225, which controls the position of switch 224 interposed between circuit 223 and adder 222.

The displacement estimate stored in delay circuit 221 is applied to the address input of frame memory 210 via a quantizer 212 which extracts the integral portion $[D]$ of the estimate from the full (integral and fractional) value $\bar{D}$. The integral estimate locates the block of pels in the previous frame which is closest to the location indicated by the displacement estimate. Memory 210 then applies the values of the pels within the selected block to an interpolator 226 via lines 227; the interpolator also receives the fractional portion $\bar{D} - [\bar{D}]$ of the displacement estimate from the output of subtractor 241 which forms the difference between the output of delay circuit 221 and the output of quantizer 212.

Interpolator 226 is arranged to compute two values based upon the fractional portion of the displacement estimate and the intensity values input thereto: first, a three point linear interpolation is made to determine the intensity value at the desired location in the previous frame, and this value is coupled to one input of a subtractor 229 via line 228. Second, interpolator 228 calculates the intensity gradient at the displaced location, and supplies this value to displacement error update circuit 223 via line 230. The second input to subtractor 229 is the intensity value then being processed, as output from a delay circuit 211 which receives its input from adder circuit 209. The output of subtractor 229 on line 231 is the displaced frame difference (DFD) defined previously. The timing relationship between displacement estimator 220 and the remainder of the encoder of FIG. 2 will be described more completely below.

Displacement error update circuit 223 is arranged to form the product of the displaced frame difference and the intensity gradient, as scaled by a scaling factor $\epsilon$ generally in the range between $10^{-5} < \epsilon < 10^{-2}$. As mentioned previously, the update term is then added to the last estimate by adder 222.

The input $\hat{I}(\bar{x}_Z, t)$ to displacement estimator 220 received from adder 209 is passed through delay circuit 211, which has a delay time of one line interval 1 minus one pel sample time. Thus, when the intensity of pel Z is being processed in the predictive encoder loop, the output of circuit 211 is $\hat{I}(\bar{x}_C, t)$ and the displacement estimator is computing the update for the displacement estimate $D_C$ associated with pel C of FIG. 1. At this time, the previous displacement estimate $D_B$ associated with the previous pel (pel B) is output from delay element 221, and the intensity value calculated by interpolator 226 is given by $I(\bar{x}_C - \bar{D}_B, t - \tau)$, indicating that the intensity values are taken from the previous frame $(t - \tau)$ at a location displaced from the location of pel C $(\bar{x}_C)$ by an amount $(\bar{D}_B)$ indicated by the immediately preceeding displacement estimate. The output of subtractor 229 is denominated $DFD(\bar{x}_C, \bar{D}_B)$, which is defined as the difference between the intensity $I(\bar{x}_C - \bar{D}_B, t - \tau)$ and the intensity $I(\bar{x}_C, t)$. The update term generated by circuit 223 as stated previously is given by $$\epsilon \nabla I(\bar{x}_C - \bar{D}_B) \cdot DFD(\bar{x}_C, \bar{D}_B) \qquad (1)$$

Selector logic 225 determines moving areas in the picture by comparing the frame difference (FDIF) value to a first threshold $T_1$. In background areas, the difference is low, and switch 224 is kept open, while the switch is closed if $FDIF > T_1$. One input to logic 225 is $I(x_C, t)$, the intensity of pel C in the present frame, derived from the output of delay element 211. The second input to logic 225 is $I(x_C, t - \tau)$, the intensity of pel C in the previous frame. This value is obtained by delaying $I(\bar{x}_Z, t)$ by one frame interval $\tau$ in frame memory 210 to derive the intensity value $I(\bar{x}_Z, t - \tau)$ on line 214, and by further delaying this output in a delay circuit 213 by an additional line interval less one sample interval to obtain $I(\bar{x}_C, t - \tau)$.

The integral displacement value $[\bar{D}_B]$ input to memory 210 from quantizer 212 is also used to recall the stored intensity values which are needed to form the displacement compensated prediction $I(\bar{x}_Z - \bar{D}_B, t - \tau)$ of the intensity value of pel Z. These intensity values are, for example, the values for the pels in box 106 of FIG. 1, which are applied to a second interpolator 215 via lines 216. It is to be noted here that the intensity values applied to interpolator 226 are different, they being the values in the neighborhood of location $\bar{x}_C - \bar{D}_B$ not $\bar{x}_Z - \bar{D}_B$. Interpolator 215 also receives the fractional portion $\bar{D}_B - [\bar{D}_B]$ of the displacement estimate from subtractor 241, and performs a three point interpolation in the same manner as interpolator 226.

The output of interpolator 215 is selected as the prediction for $I(x_Z, t)$ only when switch 240 is in the position shown in FIG. 2. In its second position, switch 240 selects the output of frame memory 210 as the predicted value. It will thus be appreciated that the present invention differs from the disclosure of the copending application Ser. No. 21071 in that a predictor selection logic circuit 250 is provided to make the selection between the two predictions.

In accordance with one arrangement of the present invention, the predictor selection is based upon the relative magnitude of prediction errors for each predictor, as determined for a set of previously processed pels A, B and C of FIG. 1 which are in the previous line. These pels are used, rather than pel Z, since the value of pel Z is not "known" at the receiver. This arrangement assumes that the error parameters for the previous pels which neighbor pel Z are similar to the error parameters for pel Z itself, which is generally the case. However, the invention is not limited to the use of three pels A, B and C, and any desired set of previous pels can be used, as long as appropriate delay elements are also employed in the circuit.

Figure 3:
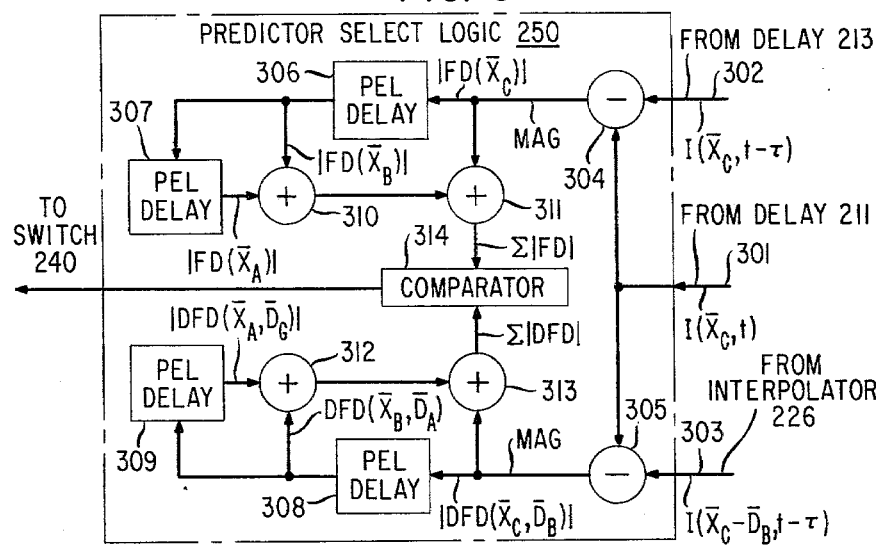
FIG. 3 is a block diagram of predictor selection logic 220 of FIG. 2.

Details of predictor selection logic 250 are shown in FIG. 3. The intensity value $I(\bar{x}_C, t)$ for pel C is received on line 301 from the output of delay circuit 211, and applied to first inputs of subtractors 304 and 305. Subtractor 304 also receives the intensity value $I(\bar{x}_C, t-\tau)$ for the same pel in the previous frame from delay element 213, so that its output is the frame difference $FDIF(\bar{x}_C)$ for pel C. Subtractor 305 receives a second input $I(\bar{x}_C - \bar{D}_B, t-\tau)$ from interpolator 226, which is the intensity at the displaced location in the previous frame specified by displacement estimate $\bar{D}_B$. Accordingly, the output of subtractor 305 is the displaced frame difference $DFD(\bar{x}_C, \bar{D}_B)$. Each of the outputs of the subtractors 304 and 305 are applied to a serial pair of one pel delay elements 306, 307 and 308, 309, respectively. The outputs of delay elements 306 and 307 represent the frame differences $FD(\bar{x}_B)$ and $FD(\bar{x}_A)$ for the previous pels B and A, respectively. Similarly, the outputs of delay elements 308 and 309, respectively, represent the displaced frame differences $DFD(\bar{x}_B, \bar{D}_A)$ and $DFD(\bar{x}_A, \bar{D}_G)$ for the same two previous pels. The magnitude portions of the frame differences for all three pels are summed by adders 310 and 311 (which ignore sign information) and applied to one input of a comparator 314. The magnitude portions of the displaced frame differences are similarly combined in adders 312 and 313 and applied to the second input of comparator 314. If $$|DFD(\bar{x}_C, \bar{D}_B)| + |DFD(\bar{x}_B, \bar{D}_A)| + |DFD(\bar{x}_A, \bar{D}_G)| \leq |FDIF(\bar{x}_C)| + |FDIF(\bar{x}_B)| + |FDIF(\bar{x}_A)|, \quad (2)$$

the output of comparator 314 maintains switch 240 of FIG. 2 in the position shown. This indicates that the motion compensated intensity value $I(\bar{x}_Z - \bar{D}_B, t-\tau)$ for pel Z is expected to be a better predictor than the frame difference value $I(\bar{x}_Z, t-\tau)$. On the other hand, if the combined frame difference for pels C, B and A are smaller, switch 240 is transferred and the prediction is made with frame difference techniques rather than with displacement compensation.

Figure 4:
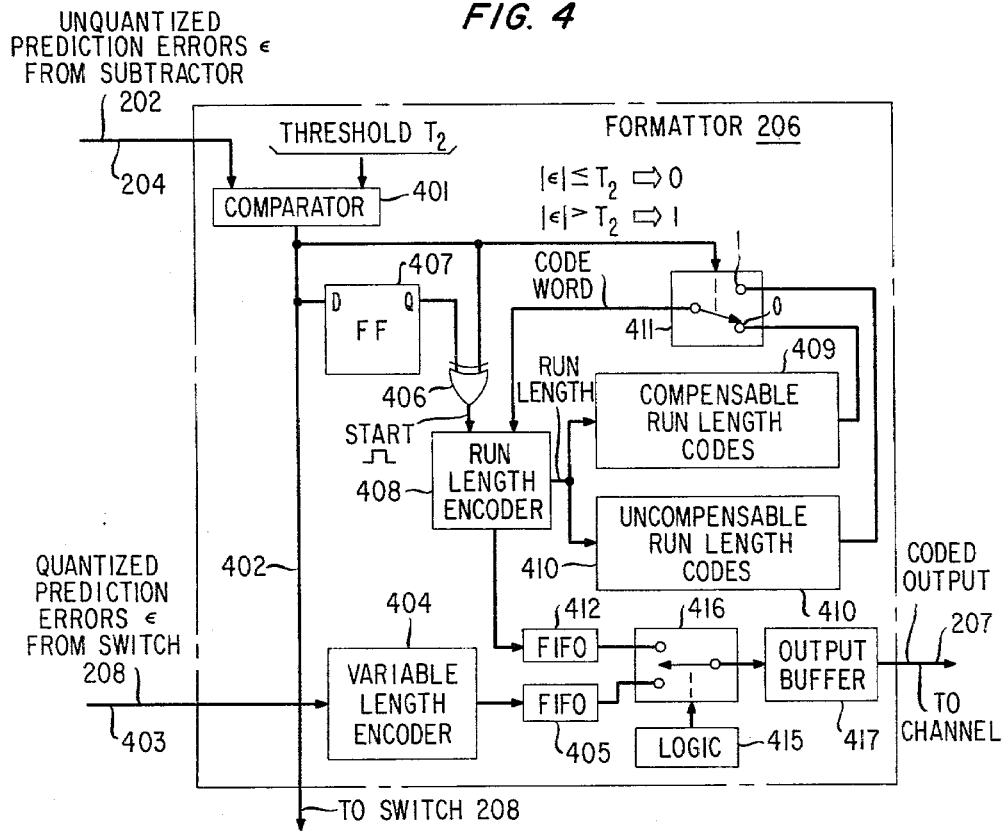
FIG. 4 is a block diagram of formatter 206 of FIG. 2.

The quantized prediction error values $\hat{\epsilon}$ output from quantizer 205 of FIG. 2 are derived, as explained above, from motion compensated or frame difference prediction, whichever is "best". These error values are encoded and transmitted to a receiver only when the magnitude exceeds a second preselected threshold value $T_2$. As shown in FIG. 4, the unquantized error values $\epsilon$ from subtractor 202 are applied to a comparator 401 and compared with the value of $T_2$. When the threshold is exceeded, switch 208 is closed with a control signal on line 402, thereby coupling the quantized error value $\epsilon$ to the formatter on line 403. This error value is advantageously applied to a variable length encoder 404, the output of which is stored in a first in-first out (FIFO) buffer 405 before transmission to a remote location. Encoder 404 may be a conventional Huffman encoder arranged to use shorter code words for more frequently occurring input values, so as to again effect bandwidth compression.

The output of comparator 401 is applied to an exclusive OR gate 406 directly and via a flip-flop 407 which acts as a one sample delay element, in order to detect transitions in the output of comparator 401. Each transition is used to start a counter within a run length coder 408, and to transfer the length of the preceeding run or segment to a pair of read-only memories 409 and 410, each of which store code dictionaries for the run length codes. If the output of comparator 401 is low, indicating a "predictable" segment or run, switch 411 is maintained in the position shown, thereby coupling a code word from ROM 409 back to encoder 408. Alternatively, if the comparator 401 output is high, indicating an unpredictable segment or run, switch 411 is repositioned, coupling a code word from ROM 410 to encoder 408. Separate code dictionaries are advantageously used for predictable and unpredictable segments since different statistical properties are expected for each group, with predictable runs being longer, in general. The code words returned to encoder 408 from switch 411 are appropriately timed and coupled to a second FIFO buffer 412.

The formatter of FIG. 4 also includes a logic circuit 415 which selectively couples the outputs of FIFO buffers 405 and 412 to an output buffer 417 depending upon the position of switch 416. The logic is arranged so that each code word for a run of predictable pels is followed by the error values for those pels. Error values for predictable pels are not transmitted with the address information, since the intensities of these pels are adequately reconstructed in the receiver without error data.

Figure 5:
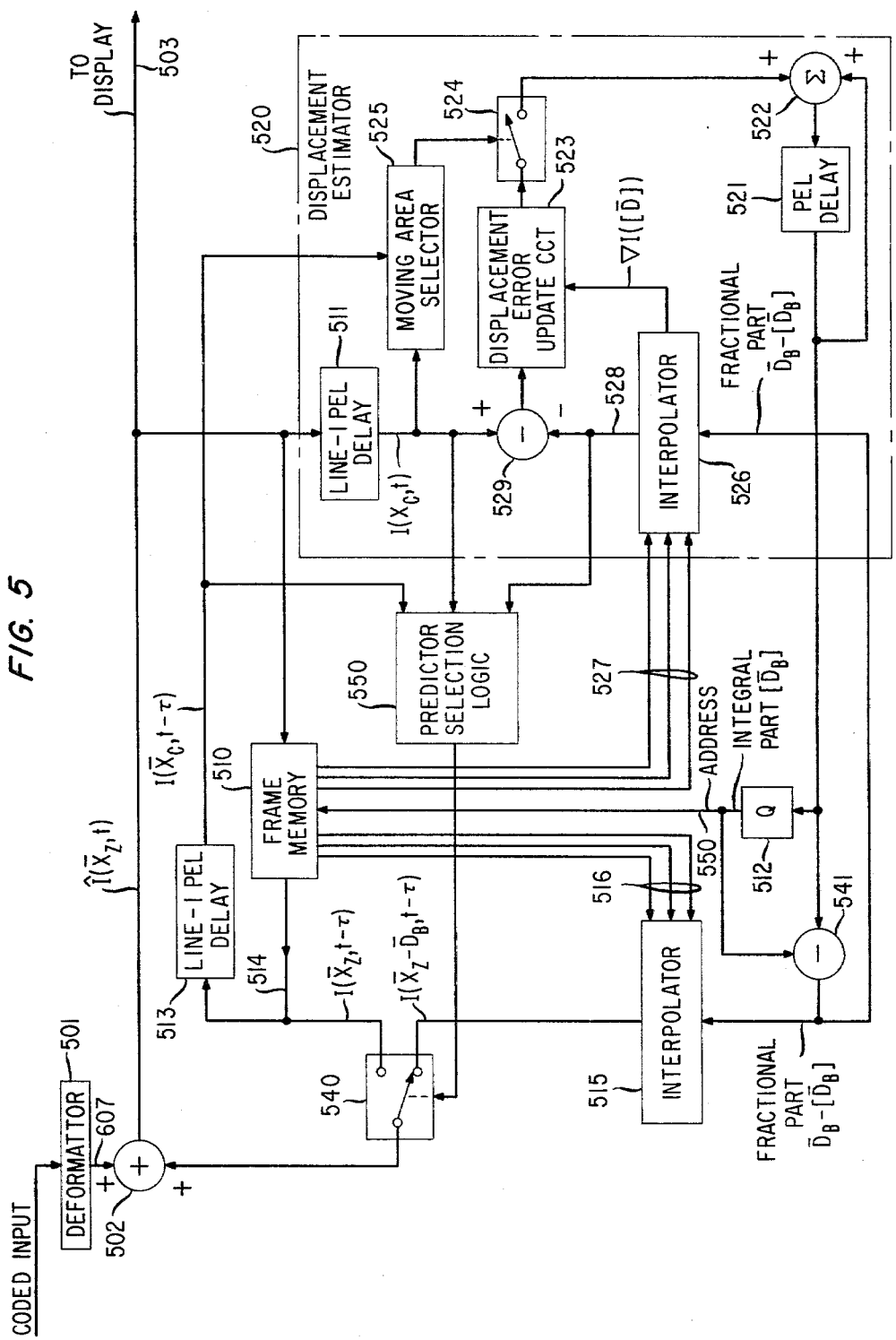
FIG. 5 is a block diagram of a decoder arranged to receive signals from the encoder of FIG. 2 and to reconstruct the encoded picture.
Figure 6:
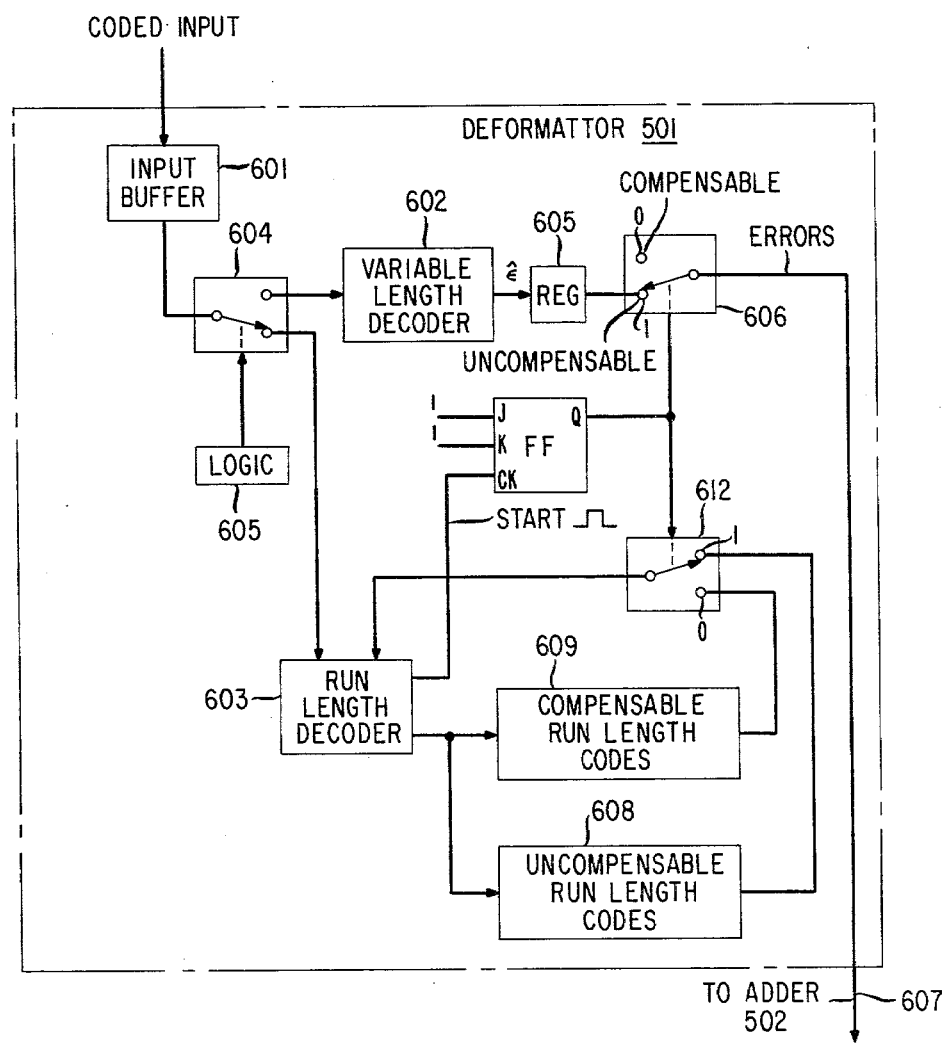
FIG. 6 is a block diagram of deformatter 501 of FIG. 5.

Encoded signals from the apparatus of FIG. 2 may be reconstructed in the decoder of FIG. 5, which includes a deformatter 501 which is shown in detail in FIG. 6. The deformatter stores coded incoming data in a buffer 601 which supplies variable length codes for predictable error values to a variable length decoder 602 and run length codes for address information to a run length decoder 603, depending upon the position of a switch 604. Logic 605 alternates the switch position such that error values for unpredictable segments follow the length codes for those segments, and so that length codes for predictable and unpredictable segments alternate. Each decoder 602 or 603 performs the inverse function as compared to encoders 404 and 408, respectively, of FIG. 4. The error values $\hat{\epsilon}$ output from decoder 602 are assembled in register 605 via line 607 when switch 606 is closed. This occurs for predictable pels.

The received run length code words applied to decoder 603 are converted to bit strings of the decoded run length by ROM's 608 and 609, which perform the inverse function of ROM's 409 and 410 of FIG. 4. At the start of each run, decoder 603 provides a start pulse on line 610 to toggle flip-flop 611. With a high toggle output, the length of the run is extracted from ROM 608, since switch 612 maintains the position shown in FIG. 6. Simultaneously, switch 606 connects the error values for each pel to line 607. At the start of the next run or segment, flip-flop 611 is toggled; for this segment, measured by the string of bits output from ROM 609, switch 606 remains open, since error values for predictable pels were not encoded. The outputs of ROM's 608 and 609 are fed back to decoder 603 to enable generation of the start pulse on line 610.

The sum of the error values output from deformatter 501 on line 607 and the predicted value $P_Z$ generated by the remaining circuitry of FIG. 5 is formed in adder 502 and made available on output line 503. This output can be displayed or stored for further processing or future use. The remaining circuitry in the predictive decoder used to generate the prediction is the same as that used in the encoder of FIG. 2. For completeness, its operation is briefly summarized.

The recovered intensity value $\hat{I}(\bar{x}_Z, t)$ on line 503 is input to a frame memory 510 which provides a delay of one frame interval between its input and its output on line 514. The memory is also addressable on line 550, and provides the stored intensity values for pels in the neighborhoods of the addressed location.

The address applied to memory 510 is a displacement estimate which is updated on a pel-by-pel basis. By virtue of the one line less one pel delay provided by delay element 511, the displacement estimate for pel C is processed by displacement estimator circuit 520 at the same time that pel Z is being processed in the predictive decoder. The previous displacement estimate, $\overline{D}_B$, for pel B, is stored in one pel delay element 521, and the integral value of this estimate is applied to the address input of memory 510 via a quantizer 512, which separates the integral portion from the full estimate value.

The displacement update is made by an update computation circuit 523 which forms the product given by Equation (1) above and adds the update term to the previous estimate in adder 522. The first term in the product, $\epsilon$, is a scaling constant generally in the range between $10^{-2}$ and $10^{-5}$. The second term, $\nabla I(\bar{x}_C - \overline{D}_B)$, is the intensity gradient at the displaced location $\bar{x}_C - \overline{D}_B$, and this value is computed in interpolator 526 which receives the stored intensity values in the neighborhood of the displaced location from memory 510 on lines 527. Interpolator 526 also receives the fractional portion of the displacement value $\overline{D}_B - [\overline{D}_B]$ from subtractor 541, and computes the intensity value $I(\bar{x}_C - \overline{D}_B, t - \tau)$ for the object in the previous frame expected to be at pel C in the present frame. This value (on line 528) is subtracted from the intensity value $I(\bar{x}_C, t)$ of pel C in a subtractor 529, and the displaced frame difference $DFD(x_C, D_B)$ is input to displacement error update circuit 523 as the third term in Equation (1).

The displacement estimate is updated only in the moving areas of the picture, when the frame difference exceeds a threshold value $T_1$. For this purpose, update circuit 525 receives the frame delayed value $I(\bar{x}_C, t - \tau)$ of pel C from a delay circuit 513 and the intensity value $I(\bar{x}_C, t)$ for the same location in the present frame from the output of delay circuit 511. If the threshold is exceeded, switch 524 is also closed.

The decoder also includes a predictor selection circuit 550 which is arranged as shown in FIG. 3. This circuit receives $I(\bar{x}_C, t - \tau)$ from delay element 513, $I(\bar{x}_C, t)$ from delay element 511, and $I(\bar{x}_C - \overline{D}^B, t - \tau)$ from interpolator 526. Circuit 550 controls the position of switch 540 in accordance with the relative values in inequality (2). Thus, the same predictor (either frame difference or displaced frame difference) used in the encoder is used in the apparatus of FIG. 5. As in FIG. 2, the motion compensated prediction is obtained from interpolator 515, which computes the desired intensity value from the neighborhood values input on line 516, using standard interpolation techniques.

The encoding technique described above was simulated on a computer using two television sequences each consisting of 64 frames (2:1 interlaced fields) of 256×256 samples each, obtained at 30 times a second and sampled at Nyquist rate from a video signal of 1 MHz bandwidth. Four frames of these two sequences, called "Judy" and "Mike and Nadine", respectively, are shown in FIGS. 4 and 5 of "Motion Compensated Television Coding Part-I", *Bell System Technical Journal*, March 1979, pp. 629-668, by A. N. Netravali and J. D. Robbins. The moving portion of the frame which varied from 15-51 percent in "Judy" and 92-96 percent in "Mike and Nadine" was determined using a conventional segmentor (for update circuit 225) as is found in conditional replenishment schemes.

Figure 7:
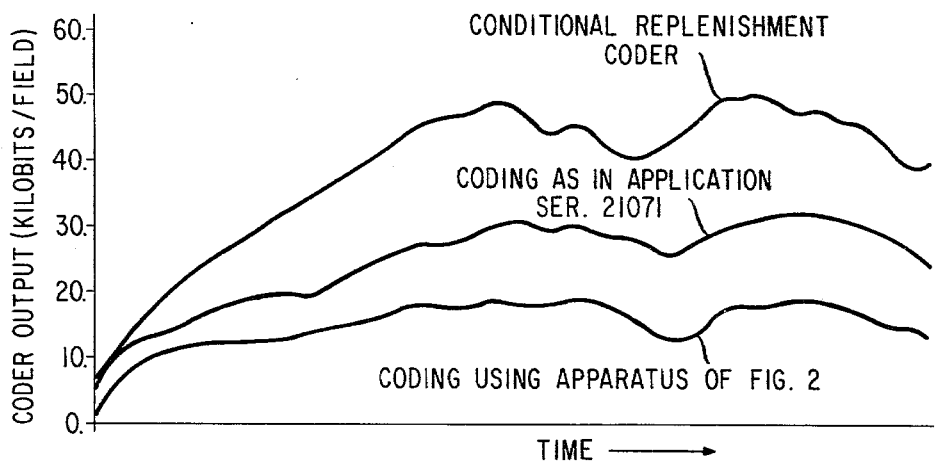
FIGS. 7 and 8 are graphs comparing the encoding efficiency of the present invention with prior art encoders for two different television sequences.
Figure 8:
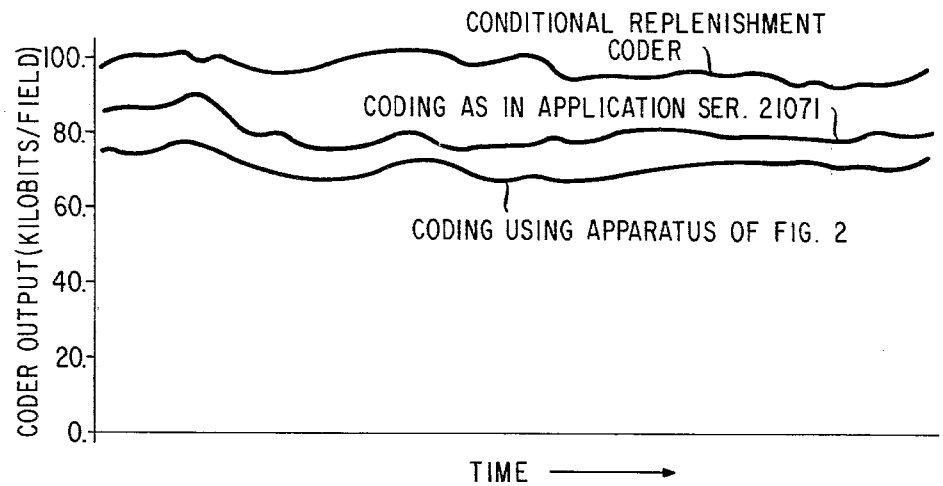

Results of simulation are shown in FIGS. 7 and 8, where the entropy of the prediction error (and the run lengths specifying segmenting information) is plotted as a function of field number (or time) for three different encoding techniques for each sequence. The three techniques are: (a) conventional conditional replenishment; (b) motion compensated coding (as described in application Ser. No. 21071) which divides the picture into three regions; and (c) motion compensated coding in accordance with the present invention, which uses switched prediction and only two segment types. It is seen from these FIGS. 7 and 8 that motion compensation in accordance with the previous application reduces the entropy by 36 percent for "Judy" and 18 percent for "Mike and Nadine", compared to conditional replenishment; motion compensation in accordance with the present invention still further reduces the entropy by 39 percent for "Judy" and 11 percent for "Mike and Nadine". This significant bit-rate reduction by motion compensation in accordance with this invention as compared to motion compensation with the technique of application Ser. No. 21071, appears to be a result of two factors: (1) elimination of three types of segment addressing and (2) more effective use of frame difference and displaced frame difference predictors.

Various modifications and adaptations of the present invention will be apparent to those skilled in the art. For example, the above-described technique determines which error values to transmit by comparison to a fixed threshold value. This tends to result in many isolated predictable and unpredictable pels, and oftens requires transmission of an excessive amount of addressing information. Instead, the intensity value of a pel may be determined to be unpredictable based not only on the magnitude of its own prediction error but also on the size of prediction errors of already transmitted surrounding pels. In this way, isolated unpredictable pels are removed, creating longer runs of both predictable and unpredictable pels. This modification, when simulated, was found to reduce the entropy by about 10-15 percent, without changing the picture quality.

If it is desired to increase the accuracy of the predictor selection logic, displacement estimates for the pel being processed in the displacement estimator (pel B) could be used in evaluating the motion compensated prediction errors at pels A, B and C, instead of using the displacement estimates for the pel preceeding the pel where the prediction error is computed. Thus, Equation (2) would be modified to read:

$$|DFD(x_C,D_B)| + |DFD(\bar{x}_B,\bar{D}_B)| + |DFD\,\bar{x}_A,\bar{D}_B| \leq |FDIF(\bar{x}_C)| + |FDIF(\bar{x}_B)| + |FDIF(\bar{x}_A)|.$$

This modification was found to improve compression by 5-10 percent. However, circuit complexity was substantially increased.

We claim:

1. Apparatus for encoding a video signal including a plurality of samples each representing the intensity of an element of a picture, including:
   means (220) for estimating the displacement of objects in said picture which occur between the present frame and a previous frame;
   first means (210, 226) for predicting the intensities of a set of previously processed ones of said pels based upon the intensities at displaced locations in said previous frame determined by said estimates;
   second means (210, 213) for predicting the intensities of said first set of pels based upon the intensities of the spatially corresponding locations in said previous frame;
   means (250) for computing first and second sums of the prediction errors associated with predictions made by said first and second means using displaced frame difference and frame difference techniques, respectively; and
   means (240) responsive to said computing means for predicting the intensity value of the present pel using the one of said prediction techniques which has the smaller prediction error sum.

2. The invention defined in claim 1 wherein said apparatus further includes:
   means (202) for forming the prediction error between the intensity value of said present pel and the predicted value thereof; and
   means (206, 208) for encoding said prediction error only if it exceeds a threshold value.

3. The invention defined in claim 2 wherein said apparatus further includes means (408) for encoding the locations of pels for which said prediction error exceeds said threshold.

4. The invention defined in claim 3 wherein said displacement estimating means includes:
   means (221) for storing a previous estimate of displacement; and
   means (223) responsive to said previous estimate for recursively updating said estimate.

5. Apparatus for encoding a series of samples each representing the intensity of an element of a picture, comprising:
   means for predicting the intensity values of a set of previously encoded pels using first and second predictors;
   means for selecting as the predicted value of the presently processed pel the value derived from the one of said first and second predictors for which the sum of prediction errors for said previously encoded set of pels is smallest; and
   means for encoding (a) the prediction error of unpredictable pels for which the prediction error for said presently processed pel exceeds a threshold, and (b) the locations of said unpredictable pels.

6. The invention defined in claim 5 wherein said apparatus further includes means for estimating the displacement of objects in said picture, and wherein:
   said first predictor is based upon the intensity of locations in a previous frame of said picture which spatially correspond to the locations of said set of previously encoded pels; and
   said second predictor is based upon the intensity of locations in said previous frame displaced from said spatially corresponding locations by an amount determined by said displacement estimating means.

7. The invention defined in claim 6 wherein said prediction error encoding means includes a variable length encoder and said location encoding means includes a run length encoder.

8. The invention defined in claim 6 wherein said displacement estimating means is arranged to recursively update each estimate based upon the value of the prior estimate.

9. Apparatus for encoding a video signal which includes a plurality of samples each representing the intensity of a particular element of a picture comprising:
   means (220) for forming an estimate of the displacement of objects in said picture between a present frame and a prior frame;
   means (226, 210, 213, 211) for forming first and second predictions of the intensities of a series of pels in said present frame based upon (a) corresponding locations in said prior frame, and (b) displaced locations in said previous frame determined by said displacement estimates:
   means (250) for selecting a predicted value for the present pel based upon the relative magnitudes of the prediction errors of said first and second prediction means for comparing the prediction error associated with said selected predicted value to a threshold; and
   means (206) for encoding the location and prediction error of pels for which said prediction error exceeds said threshold.

10. The invention defined in claim 9 wherein said encoding means includes a variable length encoder for encoding said prediction error information and a run length encoder for encoding said location information.

11. The invention defined in claim 9 wherein said displacement estimation means includes means for updating the prior displacement estimate in moving areas of said picture.

12. A method of encoding a series of samples each representing the intensity of an element of a picture, comprising the steps of:
   predicting the intensity values of a set of previously encoded pels using first and second predictors;
   selecting as the predicted value of the presently processed pel the value derived from the one of said first and second predictors for which the sum of prediction errors for said previously encoded set of pels is smaller; and
   encoding (a) the prediction error of unpredictable pels for which the prediction error for said presently processed pel exceeds a threshold, and (b) the locations of said unpredictable pels.

13. The method defined in claim 12 wherein said predicting step further includes the steps of:
   estimating the displacement of objects in said picture;
   forming a first prediction based upon the intensity of locations in a previous frame of said picture which spatially correspond to the locations of said set of previously encoded pels; and forming a second prediction based upon the intensity of locations in said previous frame displaced from said spatially corresponding locations by an amount determined in said displacement estimating step.

14. The method defined in claim 13 wherein said encoding step includes variable length encoding said prediction error values and run length encoding said locations.

15. The method defined in claim 13 wherein said estimating step includes recursively updating each estimate based upon the value of the prior estimate.

16. Apparatus for encoding a video signal including a plurality of samples each representing the intensity of an element of a picture, including:

means (220) for estimating the displacement $\overline{D}$ of objects in said picture which occur between the present frame at time t and a previous frame at time $t-\tau$;

first means (226) for predicting the intensities $I(\overline{x}_A,t)$, $I(\overline{x}_B,t)$, $I(\overline{x}_C,t)$ ... of a set A, B, C ... of said pels at locations $\overline{x}_A, \overline{x}_B, \overline{x}_C$ ... based upon the intensities $I(\overline{x}_A-\overline{D},t-\tau)$, $I(\overline{x}_B-\overline{D},t-\tau)$, $I(\overline{x}_C-\overline{D},t-\tau)$ ... at displaced locations $\overline{x}_A-\overline{D}, \overline{x}_B-\overline{D}, \overline{x}_C-\overline{D}$ ... in said previous frame determined by said estimates;

second means (210, 213) for predicting the intensities of said first set of pels based upon the intensities $I(\overline{x}_A,t-\tau)$, $I(\overline{x}_B,t-\tau)$, $I(\overline{x}_C,t-\tau)$ ... of the spatially corresponding locations $\overline{x}_A, \overline{x}_B, \overline{x}_C$ ... in said previous frame;

means (250) for computing first and second sums of the prediction errors associated with predictions made by said first and second means, respectively; and means (240, 206) responsive to said computing means for encoding the error value $\epsilon$ representing the difference between the present sample of said signal which represents the intensity value $I(\overline{x}_Z,t)$ at location $\overline{x}_Z$ and a predicted version $P_Z$ thereof, wherein $P_Z$ is predicted based upon the intensity $I(\overline{x}_Z,t-\tau)$ of the spatially corresponding location $\overline{x}_Z$ in the previous frame or the intensity $I(\overline{x}_Z-\overline{D},t-\tau)$ of the displaced location $\overline{x}_Z-\overline{D}$ in said previous frame, depending upon which of said first and second sums is smaller.

17. The invention defined in claim 16 wherein said displacement estimating means is arranged to recursively update each estimate $\overline{D}_i$ using the prior displacement estimate $\overline{D}_{i-1}$, such that $$\overline{D}_i - \overline{D}_{i-1} = \epsilon \, \overline{\nabla I}(x-\overline{D}_{i-1},t-\tau) \cdot \text{DFD}(\overline{x},\overline{D}_{i-1})$$

where $\overline{\nabla I}(\overline{x}-\overline{D}_{i-1},t-\tau)$ is the intensity gradient at location $\overline{x}-\overline{D}_{i-1}$ in the previous frame, $\text{DFD}(\overline{x},\overline{D}_{i-1})$ is the intensity difference between location $\overline{x}$ in the present frame and location $\overline{x}-\overline{D}_{i-1}$ in the previous frame, and $\epsilon$ is a scaling constant.

18. The invention defined in claim 16 wherein said apparatus further includes:

means for variable length encoding each error value only if it exceeds a threshold value, and means for run length encoding the locations of pels for which said error value is encoded.

* * * * *

UNITED STATES PATENT AND TRADEMARK OFFICE
CERTIFICATE OF CORRECTION

PATENT NO. : 4,232,338

DATED : November 4, 1980

INVENTOR(S) : Arun N. Netravali and John D. Robbins

It is certified that error appears in the above-identified patent and that said Letters Patent are hereby corrected as shown below:

Column 2, line 55, "where D" should read --where $\bar{D}$--. Column 6, line 5, "$\epsilon$" should read --$\bar{\epsilon}$--. Column 12, line 22, that portion of the formula reading "= $\epsilon$ $\bar{V}$I(x" should read --= $\epsilon$ $\bar{V}$I($\bar{x}$--.

Signed and Sealed this

Sixteenth Day of June 1981

[SEAL]

*Attest:*

RENE D. TEGTMEYER

*Attesting Officer*   *Acting Commissioner of Patents and Trademarks*